United States Patent
Murphy

(10) Patent No.: US 10,631,672 B2
(45) Date of Patent: Apr. 28, 2020

(54) GARDEN HANGING APPARATUS WITH REMOVABLE INSERT

(71) Applicant: Daniel J. Murphy, Jefferson, TX (US)

(72) Inventor: Daniel J. Murphy, Jefferson, TX (US)

(*) Notice: Subject to any disclaimer, the term of this patent is extended or adjusted under 35 U.S.C. 154(b) by 0 days.

(21) Appl. No.: 16/403,689

(22) Filed: May 6, 2019

(65) Prior Publication Data
US 2019/0343304 A1 Nov. 14, 2019

Related U.S. Application Data

(60) Provisional application No. 62/668,486, filed on May 8, 2018.

(51) Int. Cl.
| | | |
|---|---|---|
| A47G 7/04 | (2006.01) |
| F16M 13/02 | (2006.01) |
| G09F 7/04 | (2006.01) |
| G09F 7/08 | (2006.01) |
| G09F 7/02 | (2006.01) |
| G09F 7/10 | (2006.01) |
| G09F 3/20 | (2006.01) |
| G09F 7/06 | (2006.01) |

(52) U.S. Cl.
CPC ............. *A47G 7/044* (2013.01); *F16M 13/02* (2013.01); *G09F 3/20* (2013.01); *G09F 7/02* (2013.01); *G09F 7/04* (2013.01); *G09F 7/06* (2013.01); *G09F 7/08* (2013.01); *G09F 7/10* (2013.01)

(58) Field of Classification Search
CPC ..... G09F 7/02; G09F 7/04; G09F 7/06; G09F 7/10; G09F 3/20; G09F 7/08; G09F 2007/1804; G09F 2007/1813; G09F 2007/1808; G09F 2007/1817; G09F 2007/1843; A47G 7/045; A47G 7/044; F16M 13/02
See application file for complete search history.

(56) References Cited

U.S. PATENT DOCUMENTS

| | | | |
|---|---|---|---|
| 532,748 A | 1/1895 | Ball, Jr. | |
| 772,895 A | 10/1904 | Miller | |
| 1,722,245 A * | 7/1929 | Gautheron | G09F 7/08 40/620 |

(Continued)

FOREIGN PATENT DOCUMENTS

| | | | | |
|---|---|---|---|---|
| DE | 1067678 B | * | 10/1959 | G09F 7/18 |
| DE | 3821870 A1 | * | 12/1988 | G09F 7/18 |
| GB | 750108 A | * | 6/1956 | G09F 7/18 |

*Primary Examiner* — Eret C McNichols
(74) *Attorney, Agent, or Firm* — Brian K. Yost; Geoffrey Mantooth

(57) ABSTRACT

The garden hanging apparatus comprises a bracket adapted to receive an insert. The bracket comprises an extending member, a vertical member, and a brace member. The extending member and vertical member are joined together. The brace member spans between and is joined to the extending member and vertical member. The extending member, vertical member, and brace member define an interior bracket space. The insert comprises an exterior configuration generally conforming to the interior configuration defined by the extending member, vertical member and brace member. The insert may be removeably coupled to the bracket within the bracket space such that the insert nests within the bracket space.

13 Claims, 5 Drawing Sheets

(56) References Cited

U.S. PATENT DOCUMENTS

| | | | | |
|---|---|---|---|---|
| 1,725,008 A * | 8/1929 | Kugler | | G09F 7/08 40/623 |
| 2,045,378 A * | 6/1936 | Austin | | G09F 7/18 40/607.11 |
| 2,208,344 A * | 7/1940 | Reynolds | | G09F 7/10 40/611.06 |
| 2,926,442 A * | 3/1960 | Reimel | | G09F 7/22 40/607.11 |
| 3,746,294 A | 7/1973 | Johnston | | |
| 4,095,360 A * | 6/1978 | Dinan | | G09F 7/22 40/603 |
| 4,474,299 A * | 10/1984 | Andrews | | A47F 7/24 211/123 |
| 4,744,537 A | 5/1988 | Buckley | | |
| 5,287,578 A * | 2/1994 | Lovret | | E01D 11/02 14/18 |
| D348,631 S | 7/1994 | Hollinger | | |
| 5,337,986 A | 8/1994 | Vollink | | |
| 5,462,318 A | 10/1995 | Cooke | | |
| 5,694,733 A * | 12/1997 | Gallemore, II | | G09F 17/00 116/173 |
| 5,901,487 A * | 5/1999 | Thalenfeld | | A47F 5/0869 211/57.1 |
| 6,192,611 B1 * | 2/2001 | Molla | | G09F 15/0025 160/378 |
| 6,202,964 B1 | 3/2001 | Thornhill | | |
| 6,233,858 B1 * | 5/2001 | Brach, Jr. | | G09F 3/20 40/606.18 |
| 6,269,571 B1 * | 8/2001 | Thalenfeld | | A47F 5/0869 211/57.1 |
| 6,276,083 B1 * | 8/2001 | Ross | | G09F 15/0025 116/173 |
| 6,303,195 B1 * | 10/2001 | Reynolds | | A47B 96/061 248/207 |
| 6,378,232 B1 * | 4/2002 | Creech | | G09F 7/02 248/474 |
| D461,429 S | 8/2002 | Holland | | |
| 6,708,832 B1 | 3/2004 | Hannon | | |
| 6,923,141 B1 * | 8/2005 | Staats | | G09F 17/00 116/173 |
| 7,007,905 B2 * | 3/2006 | Roberts | | A47B 96/061 108/108 |
| D632,517 S | 2/2011 | Pribanich | | |
| 8,695,252 B2 * | 4/2014 | Urbina | | G09F 17/00 116/173 |
| 9,284,745 B2 * | 3/2016 | Marco | | G09F 7/18 |
| D763,009 S | 8/2016 | Murphy | | |
| 2005/0178035 A1 * | 8/2005 | Csercse | | G09F 7/04 40/607.09 |
| 2009/0178312 A1 * | 7/2009 | Honiball | | B62B 3/1408 40/308 |
| 2013/0193287 A1 | 8/2013 | Murphy | | |
| 2014/0157637 A1 * | 6/2014 | Logan | | G09F 7/10 40/606.03 |
| 2014/0231606 A1 * | 8/2014 | Sobb | | A47F 5/0823 248/224.8 |

* cited by examiner

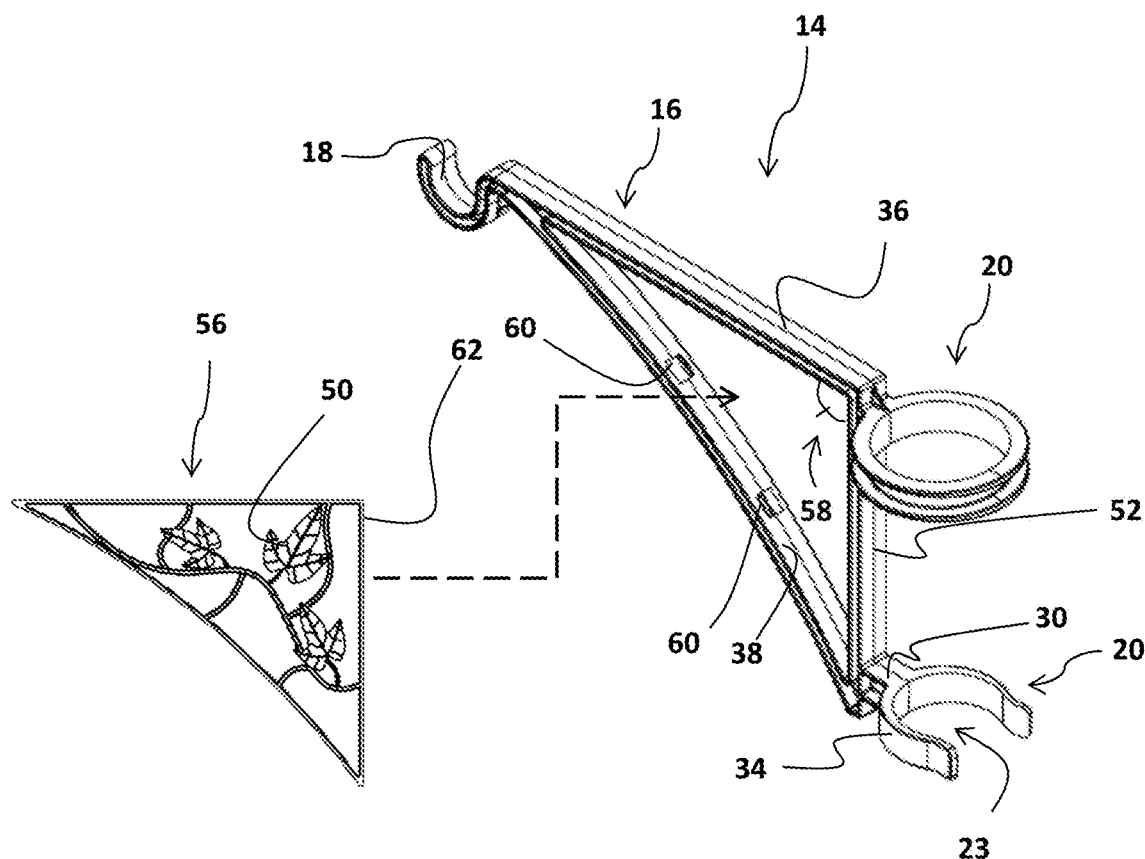
Fig. 1
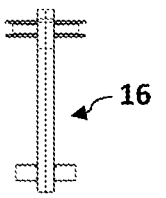
Fig. 2
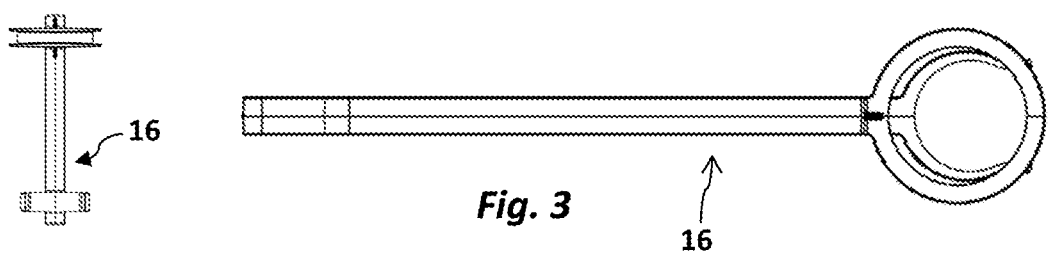
Fig. 3
Fig. 4
Fig. 5

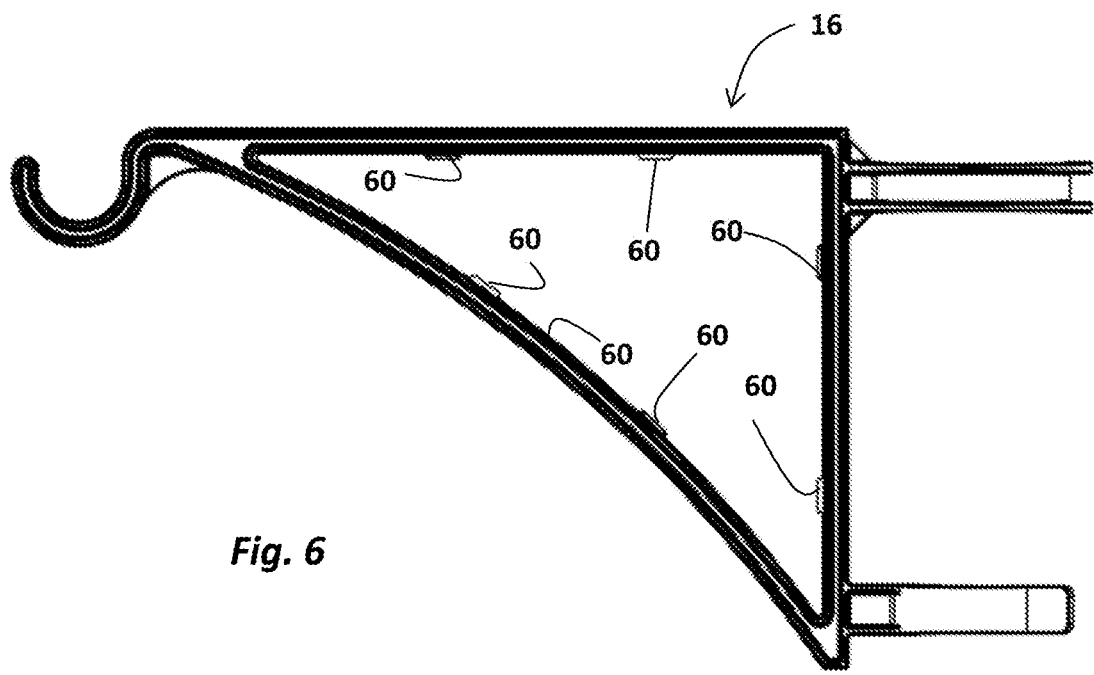
*Fig. 6*
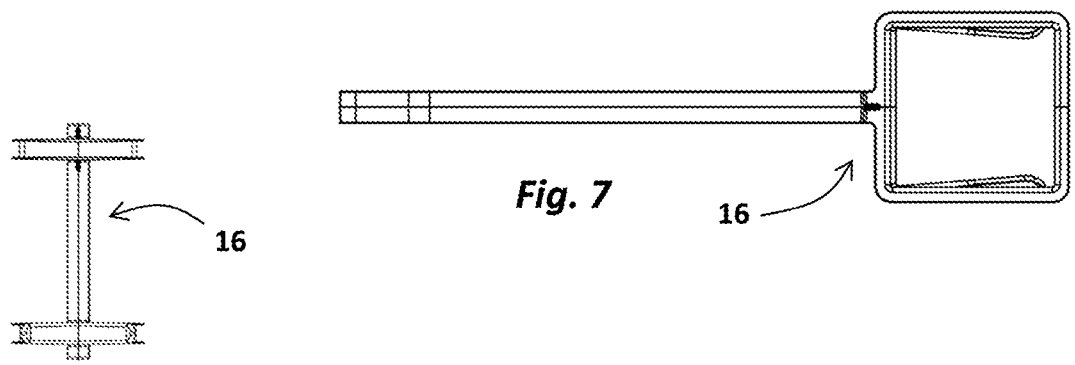
*Fig. 7*
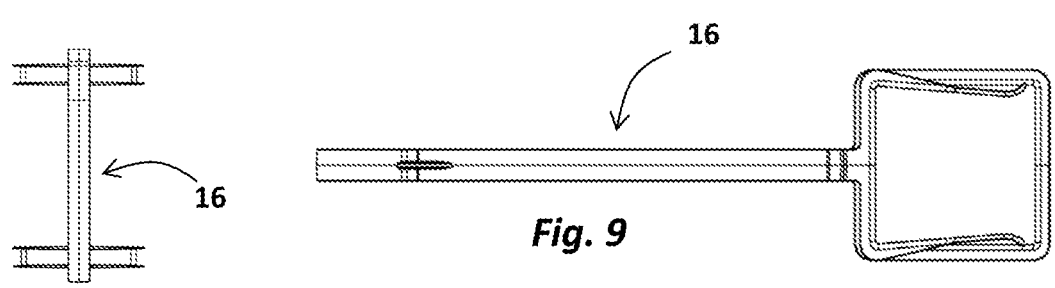
*Fig. 8*
*Fig. 9*
*Fig. 10*

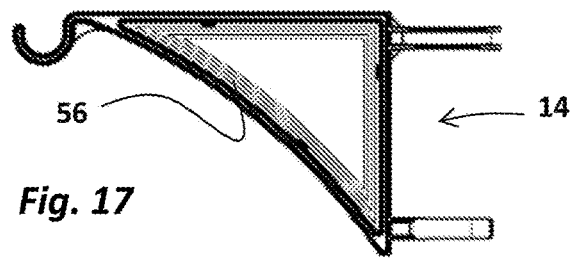
*Fig. 17*
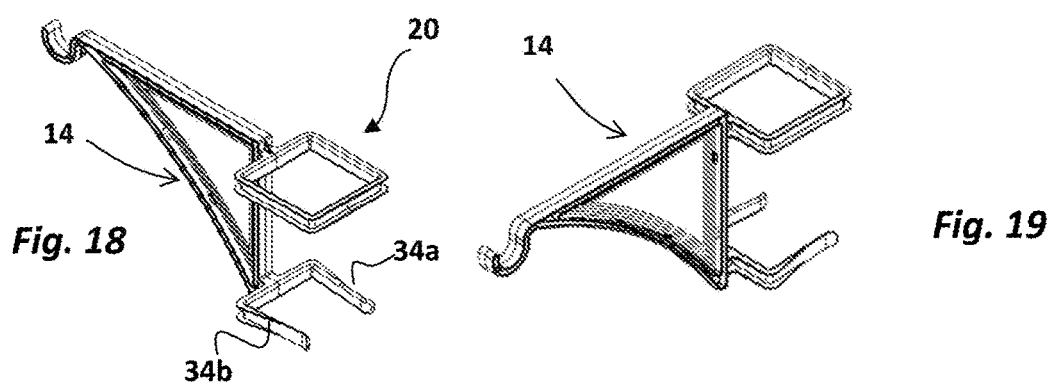
*Fig. 18*  *Fig. 19*
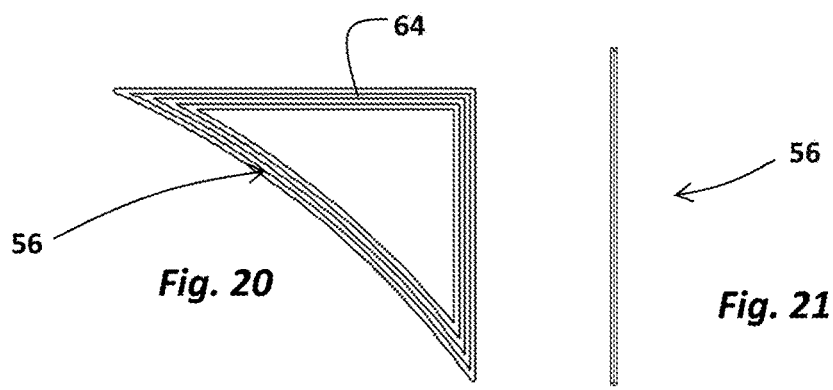
*Fig. 20*  *Fig. 21*
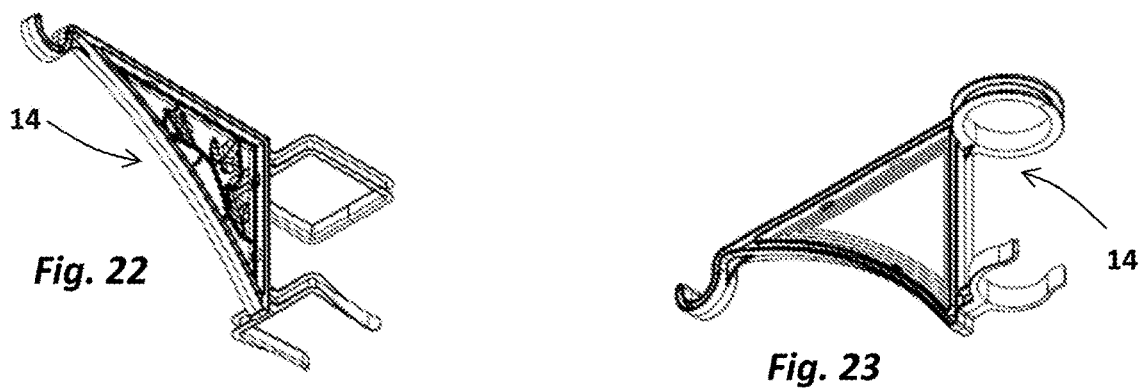
*Fig. 22*  *Fig. 23*

GARDEN HANGING APPARATUS WITH REMOVABLE INSERT

FIELD OF THE INVENTION

The present invention relates generally to hanging devices and specifically to a garden hanging device with a removable insert that permits the user to easily change the appearance of the device.

BACKGROUND OF THE INVENTION

Within the residential setting, many homeowners and renters have privacy fences around the perimeter of their yards. While important for privacy, such fences can often be an eyesore. The aesthetic appearance of a privacy fence is often improved by placing landscaping, fountains, and other ornamental fixtures near the fence. However, most landscaping features are semi-permanent in nature and, thus, not easily changed or replaced. Because of this homeowners and residents often choose to place more temporary displays in their yards. Such temporary displays often take the form of potted plants, hanging baskets, bird baths, bird feeders, and the like. With respect to those displays suitable for hanging, it is often desirable to place such displays on perimeter fencing. There are several conventional and commercially available products that permit a gardener to place a bracket or shelf on a perimeter fence having wooden fence posts. For example, some commercially available hangers are designed to be secured to wooden posts with nails or screws. However, many city ordinances now require the use of metal fence posts for perimeter stockade fencing.

With the use of metal fence posts, there is a need for a garden hanging device that can be easily attached to such posts, the pleasing appearance of which can be easily changed without the need for tools.

The garden hanging apparatus of the present invention is adapted to accept interchangeable inserts.

DESCRIPTION OF THE PRIOR ART

A number of patents and patent publications teach hanging devices. For example, U.S. Pat. No. 6,708,832 issued to Hannon teaches a device for hanging objects on a vertical support. U.S. Pat. No. 3,746,294 issued to Johnston teaches a lantern hanger assembly. U.S. Pat. No. 4,744,537 issued to Buckley, teaches a hanger bracket. U.S. Pat. No. 5,337,986 issued to Vollink teaches a hanging-plant support assembly. U.S. Pat. No. 6,202,964 issued to Thornhill teaches a multi-purpose hanger. Pribanich, U.S. Design Pat. 632,517, illustrates an ornamental design for a plant and birdfeeder hanger. Holland, U.S. Design Pat. 461,429, illustrates an ornamental design for a hanging plant brace. Hollinger, U.S. Design Pat. 348,631, illustrates an ornamental design for a plant bracket. U.S. Patent Publication US20130193287A1 to Murphy and Murphy design patent, D763,009 provide a garden hanging device comprising a fixed central portion.

However, there remains a need for garden hanging device structured and arranged to accept interchangeable inserts such that the appearance of the device can be altered to suit the taste of the user.

SUMMARY OF THE INVENTION

The present disclosure provides a garden hanging apparatus, the device being secure, easily mountable without tools, and which may be coupled to a variety of fence posts for use with a variety of objects, the device further being structured and arranged to accept interchangeable inserts such that the appearance of the device can be altered to suit the taste of the user.

In a preferred embodiment of the present invention, the device generally comprises one or more extending members, one or more brace members, a vertical member, one or more clamping members, and an insert. In a preferred embodiment such extending and clamping members are elements of a bracket. The bracket of the preferred embodiment also comprises a hook member and one or more clamp extension arms.

The interchangeable inserts are each adapted to be easily inserted within the bracket. The insert comprises a frame comprising an outside configuration generally conforming to an inside configuration of the bracket. In preferred embodiments, interior surfaces of the bracket comprise flexible tabs. These tabs are positioned on the vertical member, extending member, and the brace member. The tabs of the preferred embodiment extend inwardly towards a center portion of the bracket. Preferably, the tabs are arranged in an alternating pattern such that, when the insert is in position, each tab exerts pressure to a side of the frame opposite pressure exerted by an adjacent tab to an opposite side of the frame.

The insert may comprise ornate features. Such features may comprise decorative material which may also provide additional structural support to the bracket. In other embodiments, the insert comprises side ridges such that the insert comprises a stepped configuration.

The bracket comprises a right angle at a juncture between the extending member and the vertical member. The brace member spans between, and is coupled to, the extending and vertical member. In the preferred embodiment, the brace member is curved. In other embodiments, the brace member is generally straight. In the preferred embodiment, the extending member is generally oriented above the brace member and the hook member is positioned near an intersection of the brace and extending members. Such hook member is suitable for suspending or hanging an object such as a hanging basket.

The apparatus is structured and arranged such that it can easily be mounted to a fence post, or fence cross-member, and when so mounted, is capable of supporting an object suspended from the hook or other portion of the bracket or an object positioned on top of or within the bracket. The bracket is coupled to the post by one or more of the clamping (tension) members. In preferred embodiments, these clamping members may comprise a C-shaped spring/flexible tension assembly, a C-shaped clamp/clasp assembly, or a U-shaped spring/flexible tension assembly. Alternatively, the clamping members may comprise one or more flanges which may be used to secure the clamping member to the post.

In one embodiment, one or more of the clamping members comprise a C-shaped spring/flexible tension assembly which secures the device to the post of a stockade fence. In this embodiment, assembly comprises collars arranged so as to be in tension towards each other. The collars form an opening between them such that the assembly, when in a closed position, generally conforms to the contours of the post. The tension aspect of the assembly permits the collars to compress against the post when the assembly is positioned around the post. Tapered opening permits the assembly to be easily pressed onto a post. The clamping members may also comprise a U-shaped, C-shaped, circular, or otherwise arcuate spring/flexible tension assembly.

In one embodiment, the apparatus is secured to the post with two clamping members. In this embodiment, a clamp extension arm spans between an upper clamping member and the extending member such that the upper clamping member is positioned approximately adjacent to the extending member at the top of the bracket. At a lower end of the bracket a lower clamping member is coupled to the bracket with a lower clamp extension arm such that the lower clamping member is positioned at a lower end of the brace member at the bottom of the bracket.

In some embodiments, the top clamping member comprises a rectangular or square configuration. The lower clamping member of this embodiment comprises a lower clamping member comprising orthogonally arranged collars arranged so as to be in tension towards one another. With this arrangement, the top clamping member is adapted to be accept a square fence post, such as, for example, a 4×4 (nominal measurement) fence post often found in support of stockade fencing. The lower clamping member of this embodiment is adapted to be coupled to a portion of the square fence post and held in position by the tensioning forces provided by the collars.

The clamping members may comprise a U-shaped spring/flexible tension assembly comprising an extension arm and collars which may be positioned around the post. The collars are structured such that the assembly is flexible and elastic. Collars have tension forces acting opposite of one another such that the assembly rests in an open position. The collars may comprise padding such that the assembly will not abrade, scratch, or otherwise damage the post when placed in position. The collars may be closed about a post by use of latch mechanism so that the assembly and apparatus may be positioned on the post. The collar is structured and arranged to accommodate different sized posts and permits the clamping member to be closed around the post so that the device may be easily attached to the post without the use of tools.

In another embodiment, the bracket may comprise a flag holder which may be used to display and secure flags, banners, and other objects comprising a shaft. In another embodiment, the bracket may comprise a shelf upon which objects may be supported. In still other embodiments, the apparatus may be combined with another apparatus with an object or shelf spanning between the two devices.

The apparatus may be secured to larger diameter metal posts by use of a cushioned and padded collar assembly. The apparatus may comprise a retractable extension member. In this embodiment, the extension member is telescopically arranged. The extension member may comprise an open portion adapted to receive a hook of a hanging object, or the extension member may comprise a hook for receiving a cooperating hanging implement.

In the preferred embodiment, the garden hanging apparatus is constructed from molded plastic such as PVC, ABS, or other polycarbonates. Other materials and conventional methods of manufacture may be used. For example, the apparatus can be formed from extruded, shaped, or cast parts of metal, wood, and other suitable materials. Additionally, the apparatus may be formed from materials that are UV resistant. The apparatus can be modified to present a wooden or rustic appearance, as well as other variations. The apparatus is suitable for use with a variety of posts formed in a variety of shapes, materials, and construction.

BRIEF DESCRIPTION OF THE DRAWINGS

FIG. 1 is an isometric, exploded, left side, rear, and top view of the hanging apparatus with the insert removed from the bracket, in accordance with a preferred embodiment, the right side being a mirror image of the left.

FIG. 2 is an elevation rear end view of the apparatus of FIG. 1.

FIG. 3 is a top elevation view of the apparatus of FIG. 1.

FIG. 4 is an elevation front end view of the apparatus of FIG. 1.

FIG. 5 is a bottom elevation view of the apparatus of FIG. 1.

FIG. 6 is a side elevation view of the bracket of FIG. 1.

FIG. 7 is a top elevation view of the of a bracket in accordance with the embodiment of FIGS. 17-19, 22 and 23.

FIG. 8 is a rear elevation view of the bracket, in accordance with the embodiment depicted in FIGS. 17-19, 22 and 23.

FIG. 9 is a bottom elevation view of the of a bracket in accordance with the embodiment of FIGS. 17-19, 22 and 23.

FIG. 10 is a front elevation view of the bracket, in accordance with the embodiment depicted in FIGS. 17-19, 22 and 23.

FIG. 17 is a side elevation view of an apparatus with the insert inserted in accordance with another embodiment.

FIG. 18 is a rear and left side isometric view of the apparatus of FIG. 17.

FIG. 19 is a front and left side isometric view of the apparatus of FIG. 17.

FIG. 20 is a side elevation view of the insert of FIGS. 17-19.

FIG. 21 is a rear elevation view of the insert of FIGS. 17-19.

FIG. 22 is a lower and left side isometric view of the apparatus of FIG. 17, the right side being a mirror image of the left.

FIG. 23 is a lower and left side isometric view of the bracket of FIG. 1 with the insert of FIG. 20 inserted, the right side being a mirror image of the left.

DESCRIPTION OF THE PREFERRED EMBODIMENT

Figure 11:
FIG. 11 is a top elevation view of the insert of FIG. 1.

A preferred embodiment of the device 14 is presented in the figures referenced above. In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

This specification and appended claims describe particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of a garden hanging apparatus are described herein with respect to mounting to and holding certain objects. However, the inventive system is equally applicable for use with other surfaces and for holding other objects. Moreover, while certain materials are discussed herein with respect to various components of the various embodiments, the embodiments are not limited to such materials. For example, in a preferred embodiment, certain components are formed from plastic. However, as will be discussed in more detail below, the components of the device may comprise any suitable materials without departing from the scope and spirit of this disclosure.

Referring to FIGS. 1-27, in preferred embodiments of the present invention, the device 14 generally comprises a bracket 16 comprising one or more extending members 36, one or more brace members 38, a vertical member 52; one or more clamping members 20, and, optionally, an insert 56. In a preferred embodiment such clamping members 20 are elements of the bracket 16. The bracket 16 of the preferred embodiment also comprises a hook member 18 and one or more clamp extension arms 30. The bracket 16 of the preferred embodiment comprises a right angle at a juncture 58 between the extending member 36 and the vertical member 52. However, this juncture 58 may comprise other configurations and angles.

The brace member 38 spans between and is coupled to the extending 36 and vertical member 52. In the preferred embodiment, the brace member 38 is curved. In other embodiments, the brace member 38 is generally straight. In the preferred embodiment, the extending member 36 is generally oriented above the brace member 38 and the hook member 18 is positioned near an intersection of the brace and extending members 38, 36. Such hook member 18 is suitable for suspending or hanging an object such as a hanging basket 12.

As shown in FIGS. 1-23, the apparatus 14 is structured and arranged such that it can easily be mounted to a fence post 22, or fence cross-member, and when so mounted, is capable of supporting an object 12 suspended from the hook 18 or other portion of the bracket 16 or an object positioned on top of or within the bracket 16. The bracket 16 is coupled to the post 22 by one or more of the clamping (tension) members 20. In preferred embodiments, these clamping members 20 may comprise a C-shaped spring/flexible tension assembly 34, as shown, for example, in FIGS. 1 and 23, a C-shaped clamp/clasp assembly, or a U-shaped spring/flexible tension assembly. Alternatively, the clamping members 20 may comprise one or more flanges which may be used to secure the clamping member 20 to the post 22.

Figure 27:
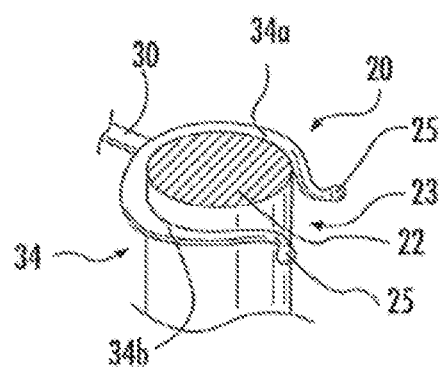
FIG. 27 is a top and rear isometric view of the clamping member, in accordance with another embodiment.

Referring to FIG. 1, there is shown a preferred embodiment of the present invention. In this embodiment, one or more of the clamping members 20 comprise a C-shaped spring/flexible tension assembly 34 (another embodiment of which is shown in FIG. 23) which secures the device 14 to the post 22 of a stockade fence. In this embodiment, assembly 34 comprises collars 34a, 34b arranged so as to be in tension towards each other 34a, 34b. The collars 34a, 34b form an opening 23 (FIG. 1) between them 34a, 34b such that the assembly 34, when in a closed position as shown in FIG. 27, generally conforms to the contours of the post 22. The tension aspect of the assembly 34 permits the collars 34a, 34b to compress against the post 22 when the assembly 34 is positioned around the post 22. Tapered, the opening 23 permits the assembly 34 to be easily pressed onto a post 22. Such action expands collars 34a, 34b to allow the post 22 to enter opening 23. As the assembly 34 is pressed further against post 22, collar ends 25 move off the post 22 allowing collars 34a, 34b to contract towards one another 34a, 34b and against the post 22. In this embodiment, the circular top clamping member 20 is placed just under the fence post cap 26 and immediately above the bracket 28 that attaches the post 22 to the stockade fence 24. The clamping members 20 may also comprise a U-shaped, C-shaped, circular, or otherwise arcuate spring/flexible tension assembly 44, as shown, for example, in FIGS. 1-6.

Referring to FIGS. 17-19, there is shown another embodiment of the device 14. In this embodiment, the top clamping member 20 comprises a rectangular or square configuration. The lower clamping member 20 of this embodiment comprises a lower clamping member comprising orthogonally arranged collars 34a, 34b arranged so as to be in tension towards one another 34a, 34b. With this arrangement, the top clamping member 20 is adapted to be accept a square fence post 22, such as, for example, a 4×4 (nominal size) fence post 22 often found in support of stockade fencing. The lower clamping member 20 of this embodiment is adapted to be coupled to a portion of the square fence post 22 and held in position by the tensioning forces provided by the collars 34a, 34b. In these and some other embodiments, the device 14 can be of various sizes and configurations. For instance, in one preferred embodiment, the device 14 comprises a hook 18 and measures approximately seventeen inches from the hook 18 to a far end of the top clamping member 20 and approximately 6¼ inches between respective centers of the top and bottom clamping members 20. In such embodiments, the vertical member 52 comprises a length of approximately eight inches. The upper clamping member 20 can vary in size. In preferred embodiments comprising rectangular upper clamping members 20, the width of the upper clamping member 20 ranges between 3.6 and 3.9 inches. In preferred embodiments comprising circular upper clamping members 20, the circumference ranges between 2.25 and 3 inches. The dimensions may vary from those mentioned in this disclosure may vary and this disclosure should not be interpreted in a limited sense to the dimensions stated. Rather, the dimensions can be smaller or larger than those mentioned herein.

Figure 25:
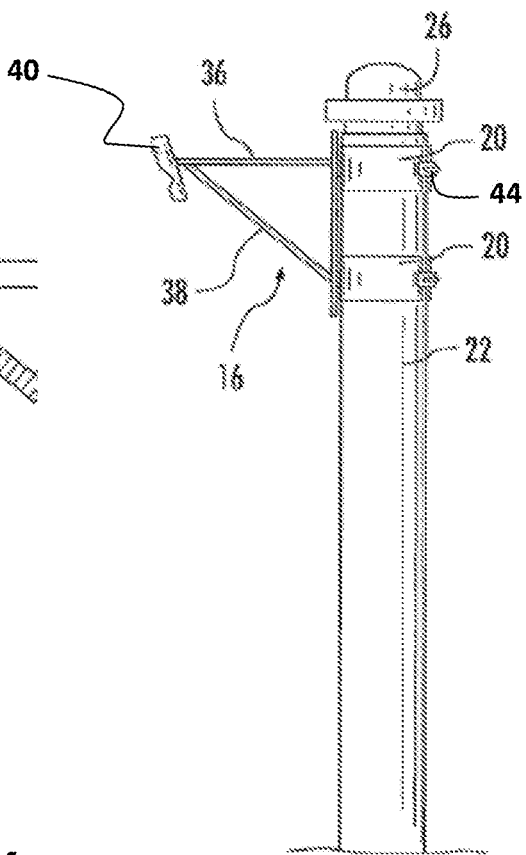
FIG. 25 is a side elevation view of the device attached to a pole, in accordance with another embodiment.
Figure 26:
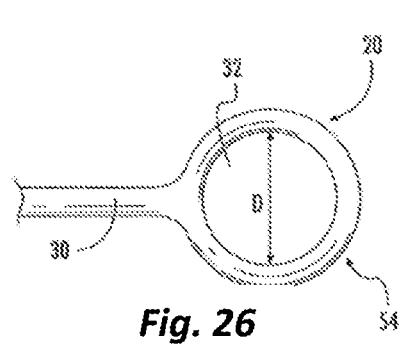
FIG. 26 is a top view of the clamping member, in accordance with another embodiment.

Referring to FIG. 25, in one embodiment, the apparatus 14 is secured to the post 22 with two clamping members 20 comprising U-shaped spring/flexible tension assemblies 44. In this embodiment, a clamp extension arm 30 spans between an upper clamping member 20 and the extending member 36 such that the upper clamping member 20 is positioned approximately adjacent to the extending member 36 at the top of the bracket 16. At a lower end of the bracket 16 a lower clamping member 20 is coupled to the bracket 16 with a lower clamp extension arm 30 such that the lower clamping member 20 is positioned at a lower end of the brace member 38 at the bottom of the bracket 16.

This assembly 44 comprises the extension arm 30 and collars which may be positioned around the post 22. The collars are structured such that the assembly 44 is flexible and elastic. Collars have tension forces acting opposite of one another such that the assembly rests in an open position. The collars may comprise padding such that the assembly 44 will not abrade, scratch, or otherwise damage the post 22 when placed in position. The collars may be closed about a post 22 by use of latch mechanism so that the assembly and apparatus 14 may be positioned on the post 22.

The collar is structured and arranged to accommodate different sized posts 22 and permits the clamping member 20 to be closed around the post 22 so that the device 14 may be easily attached to the post 22 without the use of tools. The upper clamping member 20, 44 is positioned beneath the metal fence post cap 26 and the lower clamping member 20, 44 placed generally in-line with the upper clamping member 20, 44 and around the post 22 in a lower position. With the clamping member 20, 44 placed in the secure closed position, the apparatus 14 will generally not twist or slide and will remain in a desired position on the post 22.

Figure 12:
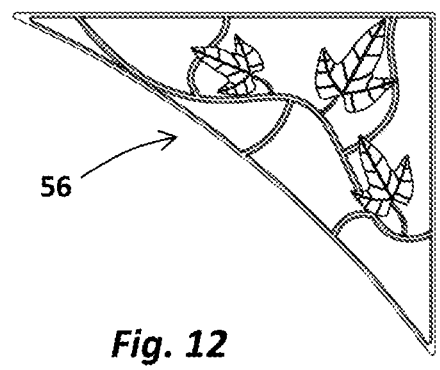
FIG. 12 is a side elevation view of the insert of FIGS. 1 and 11.
Figure 13:
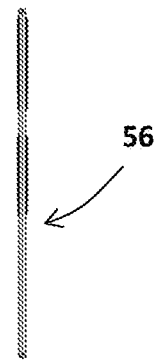
FIG. 13 is a rear elevation view of the insert of FIGS. 1, 11, and 12.
Figure 14:
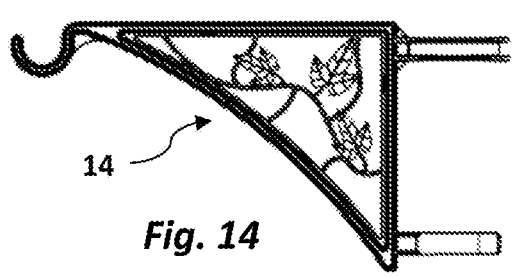
FIG. 14 is a side elevation view of the apparatus of FIG. 1, with the insert inserted.
Figure 15:
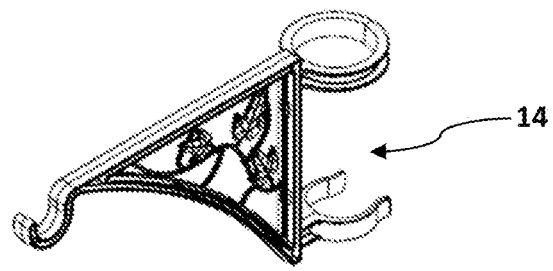
FIG. 15 is a front and left side isometric view of the apparatus of FIG. 14, the right side being a mirror image of the left.
Figure 16:
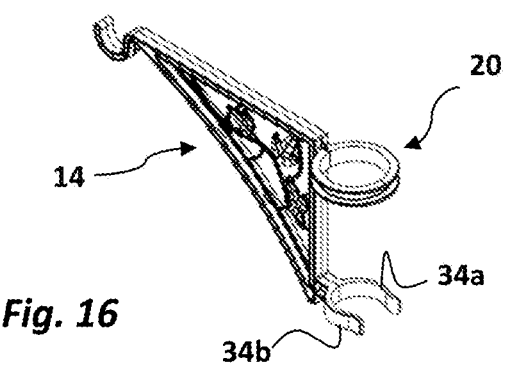
FIG. 16 is a rear and left side isometric view of the apparatus of FIG. 14.
Figure 24:
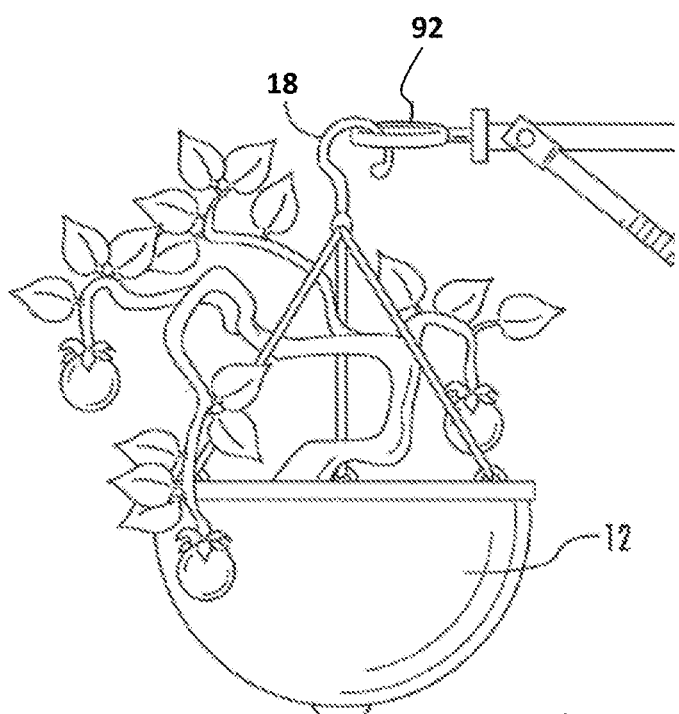
FIG. 24 is a side elevation view of the device with a basket hanging from an end portion, in accordance with another embodiment.

Referring to FIGS. 1, 12, and 20, the insert 56 of the garden hanging apparatus 14 is adapted to be easily inserted within the bracket 16. The insert 56 comprises a frame 62 comprising an outside configuration generally conforming to an inside configuration of the bracket 16. In preferred embodiments, interior surfaces of the bracket comprise flexible tabs 60. These tabs 60 are positioned on the vertical member 52, extending member 36, and the brace member 38. The tabs 60 of the preferred embodiment extend inwardly towards a center portion of the bracket 16. Preferably, the tabs 60 are arranged in an alternating pattern such that, when the insert 56 is in position, each tab 60 exerts pressure to a side of the frame 62 opposite pressure exerted by an adjacent tab to an opposite side of the frame 62. The insert 56 may be fitted within the bracket 16 in other ways. For example, the bracket 16 in some embodiments comprises a channel circumventing the inner perimeter of the bracket 16 within which the insert 56 may slide. In other embodiments, the insert 56 may be secured in position within the bracket 16 dowels, clips, snaps, or other cooperative fastening systems known in the art.

The insert 56 may comprise ornate features 50 such as are shown in FIGS. 1 and 12. Such features 50 may comprise decorative material which may also provide additional structural support to the bracket 16. Referring to FIGS. 17-20, in other embodiments, the insert 56 comprises side ridges 64 such that the insert 56 comprises a ridged or stepped configuration.

Although in a preferred embodiment, the apparatus 14 comprises tension features 46, the apparatus 14 need not necessarily comprise such tension features 46. For example, as discussed above, one or more fastener assemblies may couple extending member 36 or vertical member 52 to the fence post 22.

In another embodiment, and as shown in FIG. 25, the bracket 16 may comprise a flag holder 40 which may be used to display and secure flags, banners, and other objects comprising a shaft. In another embodiment, the bracket 16 may comprise a shelf upon which objects may be supported. In still other embodiments, the apparatus 14 may be combined with another apparatus 14 with an object or shelf spanning between the two devices 14.

The apparatus 14 may be secured to larger diameter metal posts 22 by use of a cushioned and padded collar assembly 44. The apparatus 14 may comprise a retractable extension member 36. In this embodiment, the extension member 36 is telescopically arranged. The extension member 36 may comprise an open portion 92 adapted to receive a hook 18 of a hanging object 12, or as shown in FIG. 1, the extension member 36 may comprise a hook 18 to receive a hook 18 (FIG. 24) or another hanger implement such as a wire, rope, bracket, arm, etc.

In the preferred embodiment, the garden hanging apparatus 14 is constructed from molded plastic such as PVC, ABS, or other polycarbonates. Other materials and conventional methods of manufacture may be used. For example, the apparatus 14 can be formed from extruded, shaped, or cast parts of metal, wood, and other suitable materials. Additionally, the apparatus may be formed from materials that are UV resistant. The apparatus 14 can be modified to present a wooden or rustic appearance, as well as other variations. Also, the apparatus 14 need not be limited to metal or cylindrical posts 22. Rather, the apparatus 14 is suitable for use with a variety of posts 22 formed in a variety of shapes, materials, and construction.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure, to which it is fairly, legally, and equitably entitled to be interpreted.

I claim:

1. An apparatus adapted for coupling to a fence member, the apparatus comprising:
   a bracket, the bracket comprising an extending member, a vertical member, and a brace member;

the extending member and vertical member being joined together;

the brace member spanning between and being joined to the extending member and vertical member;

the extending member, vertical member, and brace member defining an interior bracket space;

the bracket comprising a plurality of coupling elements, one or more of said coupling elements extending towards a center portion of the bracket from each of the extending member, vertical member, and brace member;

the bracket space being adapted for removeable coupling of the bracket to an insert; and the insert comprising an exterior configuration generally conforming to the interior configuration defined by the extending member, vertical member, and brace member such that the insert is structured and arranged to nest within the bracket space, secured in position by one or more of the coupling elements.

2. The apparatus of claim 1, further comprising:
a tension member;
the tension member extending from the vertical member; and
the tension member being adapted to receive the fence member.

3. The apparatus of claim 2, the tension member comprising, first and second ends, and sides, said sides spanning between said first and second ends and defining a tension member space; and
the tension member space being adapted to receive the fence member.

4. The apparatus of claim 2, wherein the extending member is adapted to permit an object to be positioned thereon.

5. The apparatus of claim 1, further comprising a ring adapted to be positioned around a circumference of said fence member when said fence member is positioned within said space.

6. The apparatus of claim 1, wherein said fence member is a generally vertical fence post.

7. The apparatus of claim 6, wherein said fence post is cylindrical.

8. The apparatus of claim 6, wherein said fence post is rectangular.

9. The apparatus of claim 1, the insert comprising a frame, the frame defining a perimeter of the insert such that the frame is positioned adjacent to one or more of the coupling elements when the insert is removeably coupled to the bracket.

10. The apparatus of claim 9, one or more of the coupling elements being flexible such that, upon insertion of the insert member, the flexible coupling elements exert pressure on the frame.

11. An apparatus adapted for coupling to a fence member, the apparatus comprising:
a bracket and an insert;
the bracket comprising an extending member, a vertical member, and a brace member;
the extending member and vertical member being joined together;
the brace member spanning between and being joined to the extending member and vertical member;
the extending member, vertical member, and brace member defining an interior bracket space;
the bracket comprising a plurality of coupling elements, one or more of said coupling elements extending towards a center portion of the bracket from each of the extending member, vertical member, and brace member; and
the insert comprising an exterior configuration generally conforming to the interior configuration defined by the extending member, vertical member and brace member; and
the insert being removeably coupled to the bracket within the bracket space such that the insert nests within the bracket space, secured in position by one or more of the coupling elements.

12. The apparatus of claim 11, the insert comprising a frame, the frame defining a perimeter of the insert such that the frame is positioned adjacent to one or more of the coupling elements when the insert is removeably coupled to the bracket.

13. The apparatus of claim 12, one or more of the coupling elements being flexible such that, upon insertion of the insert member, the flexible coupling elements exert pressure on the frame.

* * * * *